United States Patent [19]

Schiemann et al.

[11] 4,300,835

[45] Nov. 17, 1981

[54] ATTENUATOR FOR STRAY LIGHT PRODUCED IN MONOCHROMATORS

[75] Inventors: Dieter Schiemann; Wolfgang Witte, both of Uberlingen, Fed. Rep. of Germany

[73] Assignee: Bodenseewerk Perkin-Elmer & Co., GmbH, Uberlingen, Fed. Rep. of Germany

[21] Appl. No.: 146,728

[22] Filed: May 2, 1980

[30] Foreign Application Priority Data

Jun. 15, 1979 [DE] Fed. Rep. of Germany ....... 2924125

[51] Int. Cl.³ ............................................... G01J 3/18
[52] U.S. Cl. ................................... 356/334; 350/290; 356/328
[58] Field of Search ............... 356/305, 328, 331, 334; 350/290

[56] References Cited

FOREIGN PATENT DOCUMENTS 54-123085  9/1979  Japan ................................... 356/334

Primary Examiner—Vincent P. McGraw
Attorney, Agent, or Firm—S. A. Giarratana; E. T. Grimes; F. L. Masselle

[57] ABSTRACT

Stray light produced in a monochromator by the diffuse reflection of the incoming light beam specularly reflected from the surface of the diffraction grating is practically eliminated by interposing a black glass "absorbent-reflector" in the path of the specularly reflected beam. The small percentage of radiation that is not absorbed by the absorbing glass is reflected to an opposite blackened wall which diffuse reflects an extremely small percentage of the beam back to the absorbent-reflector where a very negligible part is returned to the grating surface and eventually to the monochromator exit slit.

2 Claims, 1 Drawing Figure

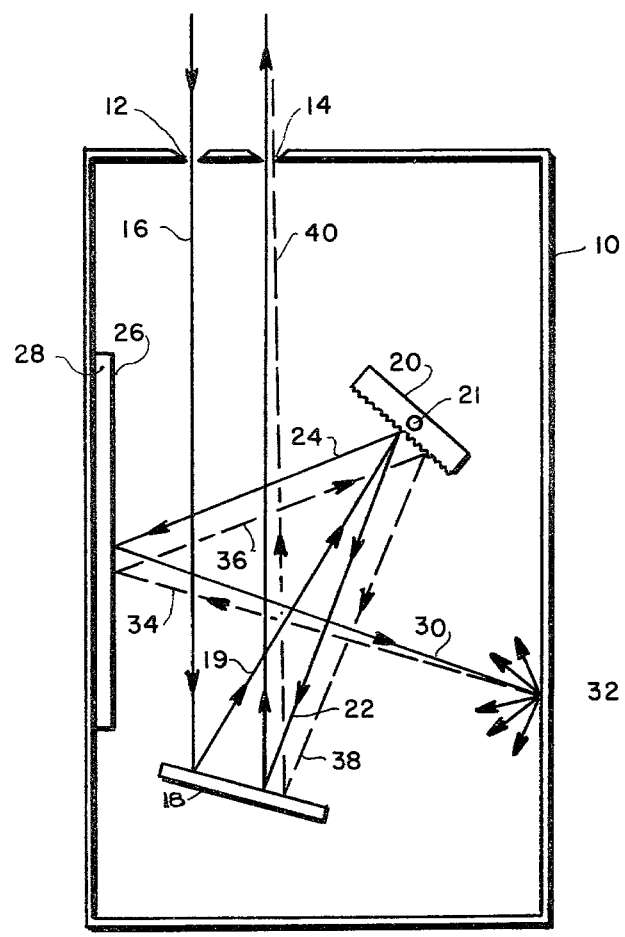

ATTENUATOR FOR STRAY LIGHT PRODUCED IN MONOCHROMATORS

BRIEF SUMMARY OF THE INVENTION

This invention relates generally to the field of spectroscopy and in particular to a grating monochromator and to alternating means for greatly reducing stray diffused light from being reflected through the monochromator exit slit.

One important characteristic of a monochromator is its ability to reject or absorb stray light produced within the monochromator housing so that it cannot be reflected through the exit slit to interfere with the diffracted main analytical beam. At present, stray light is generally reduced by narrowing the spectral range of radiation entering the monochromator. This system, however, is relatively inefficient and quite costly since special filters or light sources must often be changed when the spectrum is scanned, or the system is provided with a second monochromator to function as a premonochromator.

Another well-known method of reducing stray light is by the use of special optical elements such as holographic gratings instead of the conventional mechanically scratched gratings.

Still another means for reducing stray light is by blackening the inner walls of the monochromator housing to absorb light and prevent its reflection into the path of the usable light beams. Such blackening of the walls, while helpful, does not completely solve the problem inasmuch as a measurable quantity of stray light is still reflected to interfere with the main beam emanating from the monochromator exit slit. This stray light interference is particularly noticeable in a monochromator having a holographic grating which, itself, generates considerably less stray light than generated by a conventional mechanically scratched grating. In such a holographic grating monochromator, the proportion of stray light diffusedly reflected from the blackened inner walls of the housing is often greater than the stray light produced by the holographic grating.

It is, therefore, the object of this invention to further reduce stray light generation in a grating monochromator. In general, stray light within a monochromator housing emanates from the diffuse reflector unavoidably produced on the blackened inner walls of the housing. A light beam entering the entrance slit of the monochromator is generally reflected by a collimating mirror to the surface of the grating where the beam is dispersed and returned to a reflector and thence to the exit slit. Unfortunately, an appreciable quantity of light striking the grating surface is specularly reflected from that surface directly to the blackened inner walls of the monochromator housing. These walls, while blackened to prevent reflection, serve as a diffuse reflector so that measurable quantities of radiation thus diffused from the inner walls is reflected both directly through the exit slit and back to the grating surface where it may be specularly reflected back to the entrance slit and diffused by the diffraction grating. It is the purpose of this invention to eliminate the stray light generated by this zero order beam reflected from the surface of the diffraction grating.

Briefly described, the invention reduces interfering stray light in a monochromator by the use of an absorbing material having a highly reflective surface, such as a black glass plate that absorbs radiation in the wavelength range that is being used. The polished reflective surface is positioned in the monochromator housing to intercept the zero order radiation specularly reflected from the grating surface, an appreciable amount of which would otherwise be reflected by the diffuse reflector interior walls. The absorbent-reflector material thus reflects all non-absorbed zero order radiation toward a blackened interior wall or diffuse reflector. An extremely small amount of the light reflected from this diffuse reflector may then return to the absorbent-reflector surface to be again reflected to the grating surface; however, the remaining stray light thus produced is extremely small and is negligible.

DESCRIPTION OF THE DRAWING

The single drawing is a simplified schematic cross-section view of a typical monochromator employing the invention.

DETAILED DESCRIPTION

While apparent that the invention may be used in any type of monochromator, the drawing schematically illustrates a typical Littrow grating monochromator incorporating the absorbent-reflector of the invention. The monochromator includes a rectangular housing 10 having at one end an entrance slit 12 and an exit slit 14. A light beam 16 passes through the entrance slit 12 and is reflected by a collimator mirror 18 to the surface of the diffraction grating 20. In the embodiment illustrated, the grating 20 is preferably a holographic grating rotatable about an axis 21 normal to the plane of the drawing. The collimated beam 19 is thus diffused by the grating 20 and the resulting monochromatic collimated light beam 22 is returned to the collimating mirror 18 where it is thereby focused on the exit slit 14.

Unfortunately, an appreciable portion of the collimated beam 19 is specularly reflected from the surface of the grating 20. As previously discussed, this specularly reflected zero order beam 24 would, without this invention, fall on a blackened inner wall of the housing. Although blackened, this inner wall constitutes a diffuse reflector which will reflect an appreciable portion of the zero order beam back to the surface of the grating 20 where it would subsequently be reflected back into both the entrance and the exit slits of the monochromator. The invention, however, comprises an absorbing material having a highly reflective surface such as a black glass plate, and is referred to herein as an absorbent-reflector. This absorbent-reflector is positioned to intercept the zero order beam 24 and is sufficiently large to intercept beam 24 from any angle that the grating 20 is rotated about its axis 21 to scan desired wavelengths.

The absorbent-reflector preferably includes a body 28 of heavily absorbing material having an outer polished surface 26. Preferably the absorbent-reflector is a black glass plate in which typically approximately 96% of incident light is refracted into the absorbent body while the remaining approximate 4% is reflected from the surface 26. Thus, about 96% of the zero order beam 24 impinging upon the reflecting surface 26 of the absorbent-reflector will be absorbed by the absorbent body 28 while approximately 4% will be reflected as beam 30 to a diffuse reflector 32 formed by the opposite blackened inner wall of the monochromator housing 10.

A very small portion of light emanating from the diffuse reflector 32 returns as beam 34, illustrated by the dashed line, to the reflecting surface 26 where it is again reflected back toward the surface of the grating 20, and thence to the collimating mirror 18 and the exit slit 14. For example, if a black glass absorbent-reflector is used, approximately 96% of the zero order beam 24 is absorbed by the absorbent body 28 whereas the remaining 4% is reflected from the surface 26 as the beam 30. The light subsequently reflected back by the diffuse reflector 32 is extremely small and may be assumed to have the small factor, B. Thus, the returning stray light beam 34 may have an intensity of 0.04B of the zero order beam 24. When again reflected by the reflecting surface 26, this returning beam is again absorbed so that only 4% of the returning beam is reflected back to the grating 20. Hence, only about 0.0016B of the intensity of the zero order beam 24 is returned to the grating. In practice, this provides an additional attenuation by a factor of approximately 0:600.

Having thus described the invention, what is claimed is:

1. Attenuating means for the virtual elimination of stray light produces within grating monochromators by the diffuse reflection of zero order radiation specularly reflected from the surface of the grating, said attenuating means including:

an absorbent-reflector positioned within the monochromator housing for intecepting the zero order radiation, said absorbent-reflector comprising a body of light beam radiation absorbent material having a highly reflective surface, said reflective surface being oriented for reflecting all radiation not absorbed by said material to a diffuse reflector in said housing.

2. The attenuating means claimed in claim 1 wherein said absorbent-reflector is a black glass plate that absorbs radiation in the employed wavelength range.

* * * * *

UNITED STATES PATENT AND TRADEMARK OFFICE
CERTIFICATE OF CORRECTION

PATENT NO. : 4,300,835
DATED : November 17, 1981
INVENTOR(S) : Dieter Schiemann & Wolfgang Witte It is certified that error appears in the above-identified patent and that said Letters Patent are hereby corrected as shown below:

Column 3, line 20, change "0:600" to --1:600--.

Column 4, line 4, change "produces" to --produced--.

Column 4, line 9, change "intecepting" to --intercepting--.

Signed and Sealed this

Fourteenth Day of September 1982

[SEAL]

Attest:

GERALD J. MOSSINGHOFF

Attesting Officer

Commissioner of Patents and Trademarks